United States Patent

[11] 3,546,382

[72] Inventor Lloyd E. Embury
169 Oakdale Road, Downsview, Ontario, Canada

[21] Appl. No. 737,607
[22] Filed June 17, 1968
[45] Patented Dec. 8, 1970
[32] Priority June 16, 1967
[33] Great Britain
[31] No. 27967/67

[54] TELEPHONE ACTUATING ALARM ASSEMBLY
6 Claims, 5 Drawing Figs.

[52] U.S. Cl. .......... 179/5, 179/90
[51] Int. Cl. .......... H04m 11/04, H04m 1/44
[50] Field of Search .......... 179/5, 5(P), 90, 90(ADO), 90(B)

[56] References Cited
UNITED STATES PATENTS

| | | | |
|---|---|---|---|
| 3,095,478 | 6/1963 | Adams | 179/5 |
| 3,288,933 | 11/1966 | Beeston | 179/5 |
| 3,360,607 | 12/1967 | Oppenheimer | 179/5 |

*Primary Examiner*—Kathleen H. Claffy
*Assistant Examiner*—Douglas W. Olms
*Attorney*—Cecil C. Kent

ABSTRACT: A telephone call is caused to operate as an alarm when it originates from a source recognized by the receiver of such call, such call being automatically made following a change of state in an alarm circuit, the making of such call being effected by pulsing the receiver button or hook of a telephone set in correspondence to the pulsing which conventionally occurs in dialing a given number, the device being structured electromechanically so that the instructed recipient of such a call at any preselected number can be alerted.

INVENTOR.

Lloyd E. Embury

BY

Cecil C Kent

Atty

INVENTOR.

Lloyd E. Embury

BY

Cecil C. Kent

Atty

TELEPHONE ACTUATING ALARM ASSEMBLY

The present invention is an assembly intended to be actuated by an associated alarm circuit energized by the advent of such as for, unauthorized entry into premises, some service failure such as heating, refrigeration, pumping system of the like, and when so activated to simulate the dialing of a predetermined number by an adjacent telephone through the intermittent actuation of the telephone button, hook or the like which is usually and conventionally held depressed by the weight of the telephone receiver, which intermittent actuation is known to produce the same effect of dialing the number which corresponds to such intermittent actuation.

The invention also consists of means for providing an alarm as in the last preceding paragraph stated which is intended to be purchaseable at a modest price, requires no skilled or qualified installation assistance, which provides a means for practically silently indicating unauthorized entry so that the intruders may be apprehended without suspecting that an alarm has been sent out, and which repeats the call a considerable number of times in the event that a series of rings of the called telephone does not bring a response.

The invention further comprises in addition to the foregoing, means for returning the line of the called telephone when the alarm call has been answered, in order that the person at the called telephone end may phone the police, fire department or the like in those situations where the line is not given back to the called telephone promptly after the recipient of the call returns the receiver to the cradle, hook or the like prior to removing it again for the purpose of making a call for help to police, fire department, etc. as aforesaid.

The invention also comprises, in combination with the foregoing a telephone alarm system for placement adjacent a conventional telephone set as in the front office or executive office for example of a small plant, the assembly being compact and relatively light in weight, involving no connection of wires to the mains since it is battery operated, and in no way whatsoever interferes with telephone company owned equipment, the only routine practice to be observed by the user thereof being to take the receiver or handset off the nearest adjacent telephone set (most usually a desk set although it could as easily be a wall set if necessary) and to place the receiver or handset in a convenient receptacle provided for on the top of the alarm assembly boxing.

The invention further resides in the foregoing together with a quiet sounder unlikely to be heard by intruders any more than a few feet away and in the same room which is actuated as soon as the aforesaid simulated dialing commences but is just sufficiently loud to be capable of being registered by the adjacent receiver so that it can be recognized by the recipient of the alarm call when the called telephone receiver is placed to the ear.

The invention also comprises in combination with the foregoing, a set of semicircularly arranged essentially cylindrical elements, equaling in number the number of digits required to make a telephone call within the area concerned, each of said elements being rotatable and having thereon space for ten rows parallel with the rotary axis of each element, said rows each containing a different number of radially projecting promontories from one to ten in a single file thereof over which a follower action containing upon its distal end a small microswitch capable of being swept slowly over said promontories in a single plane thus to initiate intermittent depression of the associated telephone button, hook or the like through the agency of a lever and solenoid. As a result it will be apparent, and it is part of the invention, that the aforesaid elements may be rotated so that the equivalent of any predetermined telephone number can be presented to the sweep-arc of said follower action and switch.

With the foregoing in view, and such other or further purposes advantages or novel features as may become apparent from consideration of this disclosure and specification, the present invention consists of the inventive concept which is comprised, embodied, embraced, or included in the method, process, construction, composition, arrangement of parts, or new use of any of the foregoing, herein exemplified in one or more specific embodiments of such concept, reference being had to the accompanying FIGS. in which.

In the drawings, like characters of reference designate similar parts in the several FIGS.

Figures 1, 4:
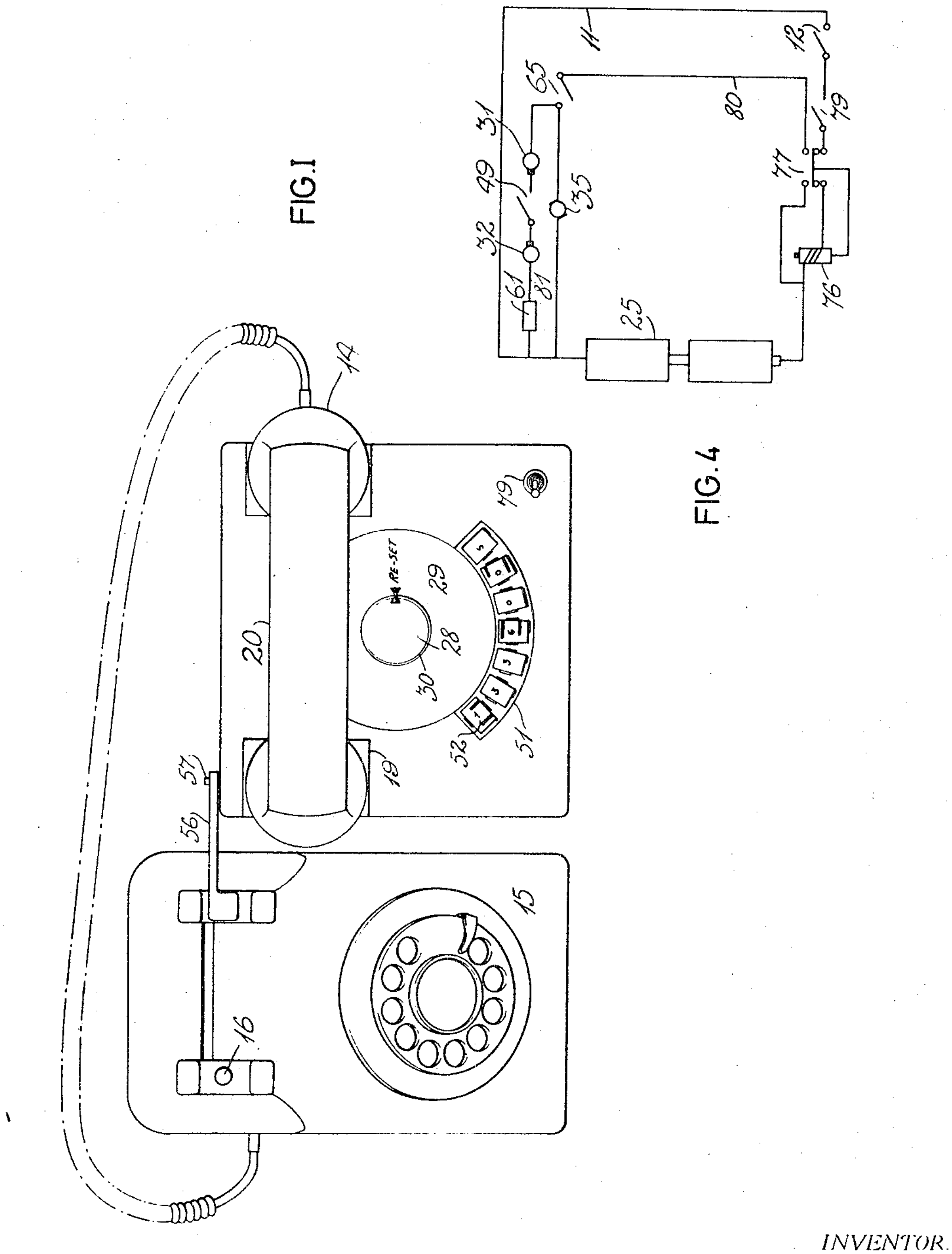
FIG. 1 is a plan view of the present invention shown in situ with respect to a standard telephone desk set.
FIG. 4 is a circuit diagram of the present invention.
Figure 5:
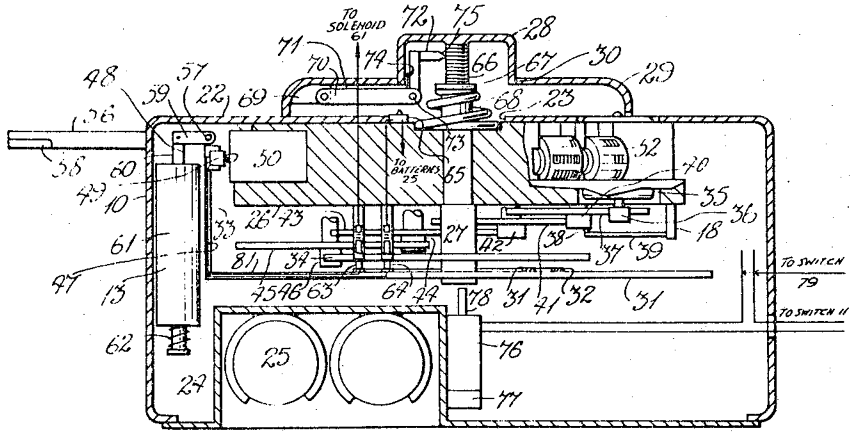
FIG. 5 is a cross-sectional elevation substantially on the line 5–5 of FIG. 2.

By way of summary preliminary description for consonance in the terminology of this disclosure with the accompanying claims, the invention is an alarm assembly collectively designated 10 for use in association with an alarm circuit 11 actuated by fire, unauthorized entry, service failure or the like as indicated and energized or completed by some action which will close a switch such as that designated 12, and comprises in combination means collectively designated 13 operable upon actuation of the aforesaid alarm circuit for controlling the opening of a telephone line by simulating the removal of the receiver 14 of a telephone set 15 from one of the buttons 16 (hook or the like) which is conventionally depressed by the weight of said receiver, and means collectively designated 17 for simulating the dialing of a predetermined telephone number by initiating the intermittent actuation of said button (hook or the like) in correspondence with the intermittent action which would occur in the conventional dialing of said number. In this connection however, it is essentially to be understood that the numbers 13 and 17 do not entirely designate all the parts of the two stated means.

The assembly also includes means generally designated 18 for emitting a characteristic sound following completion of said dialing-simulating action, together with means for making said sound audible to listener at the receiver of the telephone, the number of which is dialed as aforesaid, such means comprising the facility 19 whereby the handset 20 is conveniently cradled adjacent to 18 so that sound may be transmitted through the receiver portion 14 thereof as will presently become apparent. At this point however, it may be stated that without the sounder, if the listener at the receiving end stays on the line sufficiently long for a subsequent simulated dialing operation to be performed, that dialing operation would be heard which may very well also be recognized as an alarm. Proceeding therefore now to describe the invention with greater particularity the same is comprised in the statement which follows.

The invented alarm assembly is housed within a rectangular boxing 21 having a cover plate 22 provided with a central aperture 23. Recessed within any suitably accommodating base such as 24 may be a set of flashlight batteries 25 or the like sufficient to power the assembly for a repetition of several repeated calls.

Suitably secured within the boxing 21 and generally centred with respect thereto is a supporting structure 26 through the centre of which extends a rotatable and end shiftable drive spindle 27. Secured to the upper end of the drive spindle is a cap 28 by means of which the spindle may be depressed as will hereinafter be explained. Surrounding the cap is a shallow annular turret 29 removably secured upon its outer edge to cover plate 22 but provided with a central aperture 30, cap 28 being free of the turret to be moveable vertically as already indicated.

Secured near the base of drive spindle 27 for rotation therewith is a circular commutator plate 31 upon which is mounted a pair of inner and outer conductor rings 31 and 32 respectively. Plate 31 is keyed for rotation to and with spindle 27. Projecting upwardly from a point upon the rim of plate 31 is an upwardly extending sweep or follower arm 33. Also keyed for rotation to spindle 27 in a spindle drive gear 34.

Suitably secured to supporting structure 26 is the source of power for the invention in the form of a small electric motor 35. To the armature shaft thereof is keyed the primary drive gear 36. In mesh with same is a second gear 37. Near the perimeter of any suitable one of the gears being described, and projecting downwardly therefrom is a small dog 38 capable of actuating the reed or spring 39 forming part of sounder 18. Coaxially secured for rotation with gear 37 is the pinion 40 which in turn drives gear 41. A pinion 42 coaxial with and keyed to the supporting shaft of gear 41 drives gear 43. A pinion 44 coaxial as aforesaid with gear 43 drives gear 45. A similarly axially secured pinion 46 is caused by the rotation of gear 45 to rotate spindle drive gear 34. The train of gearing designated 36 through 46 and 34, obviously may be varied in number according to the reduction required. However, experience to date has dictated that the gear 34, and hence the follower action 33 should make one complete revolution in approximately 60 seconds.

Leads 47 and 48 extending from ring 31 and 32 carry current through a small microswitch 49 at the upper end of follower arm 33. When the assembly is inactive, switch 49 is depressed by the projecting segment 50 secured to the supporting structure 26.

A semicircular aperture 51 is provided in cover plate 22 through which partially project (sufficiently to enable them to be rotated manually) a set of semicircularly arranged elements 52, each of which is substantially cylindrical and is journaled for rotation on supporting structure or mounting structure 26. The set of elements is however normally stationary, as is also said mounting structure, i.e. nonrotatable, and each element has small, spaced, radially projecting promontories 53 on the surface thereof. These promontories are arranged in rows 54 parallel with the rotary axis of each element, there being space on the external surface of each element for ten such rows, each row containing a different number of promontories from one to ten. It will thus be apparent, as from FIG. 1, that the promontories can be arranged such that a single file 55 thereof projects horizontally, or in other words projects parallel with the plane of cover plate 22. Such file of promontories is contacted as switch 49 on the follower arm 33 moves past and against the semicircularly arranged promontories so that the elements may be said to be linearly and successively engageable by follower action 33.

In the accompanying FIG. 1 a semicircular arrangement of seven promontory-studded elements is shown to provide for the calling of any seven-digit telephone number. The files 55 of promontories may, if desired, be visibly numbered for ease of selection. Promontories corresponding with a preselected telephone number are shown projecting horizontally to be contacted by the switch 49 as the same moves counterclockwise, in the accompanying FIG. 1, and from the foregoing it will be apparent that the physical or digital representation of any seven figure number can be presented for contact by the switch 48.

A lever 56 rotatable about the shaft 57 is located at one corner of boxing 21, the same being provided with a distal plate 58 conveniently capable of contact with the adjacent button 16. A crank arm 59 rotates shaft 57 and the endwise shifting influence of the rod 60 upon energization of solenoid 61. It is to be understood that this solenoid is so spring loaded as for example 62 that the same, through the linkages just referred to, normally holds plate 58 and the button beneath is depressed as if a telephone receiver were resting upon said button.

Projecting downwardly to make contact with conductor rings 31 and 32, are spring-biased brushes 63 and 64. On top of mounting structure 26 near its center is a microswitch 65, the press button of which projects upwardly. The upper end of spindle 27 is reduced and screw threaded as at 66, such reduced portion being integral with cap 28. A projecting annular shoulder 67 is secured to spindle 27 at the lower end of reduced portion 66. Held captive between the upper surface of mounting structure 26 and shoulder 67 is a beehive spring 68. Pivotally secured to bracket 69 within turret 29 is a compound lever 70 comprising the horizontally disposed portion 71, and the inverted L-shaped portion 72 pivoted at 73 to portion 71. A spring 74 biased L-shaped portion 72 against reduced spring threaded portion 66, the inner end 75 of portion 72 being pointed so as conveniently to be received within the spiral thread of the portion 66. Secured to base 24 is a solenoid 76. Beneath this solenoid is a reset switch or relay 77. Projecting upwardly from solenoid 76 is a plunger 78 capable of being contacted by the downward end thrust of spindle 27 as will presently be described.

OPERATION

Assuming alarm switch 12 to be triggered so as to operate upon any such emergencies as already have been referred to or others, the user of the present telephone alarm assembly will place the boxing or cabinet 21 adjacent to his telephone desk set, or the telephone desk set adjacent to the boxing, before leaving his office or plant, will take the handset 20 off the buttons 16 and place it in the cradle 19 of the said boxing. He will also make sure that the on-off switch 79 is closed.

If now the switch 12 is activated, current will flow in alarm circuit 11 from batteries 25 through solenoid 76. Actuation of this solenoid will operate reset switch 77 to deenergize the alarm circuit 11 and transfer current to motor circuit 80.

Current will now flow in the said motor circuit through microswitch 76 which is normally closed to actuate motor 35.

Actuation of motor 35 will cause follower action 33 to commence rotation counterclockwise with respect to the accompanying FIG. 1 from its null point at which switch 49 dwells in an open state against the segment 50. Electrical potential also exists, by virtue of closing switch 65, in the telephone actuating circuit 81.

As the sweep arm moves from segment 50 to the nearest element 52 (which should normally take about five seconds) and immediately the switch 49 is released from the depressing surface of segment 50, (closing said switch) solenoid 61 is actuated to lift lever 56 thus causing the button 16 normally held down thereby to rise. The five seconds during which the arm moves from segment 50 to the first element 52 is sufficient to establish dial tone.

As the sweep arm now continues to travel counterclockwise over the promontories 53, the switch 49 will be intermittently depressed and released to cause intermittent energization of solenoid 61, consequent vertical fluttering of the lever 56 and movements of the button 16 in accordance with what takes place when the fingering of a conventional telephone dial returns after being rotated clockwise. When the sweep arm 48 has traversed the set of elements 52, ringing of the called telephone commences during the ensuing time (as long as may be desired according to the gearing ratio) which it takes for said sweep arm to move from the last element back to the segment 50.

If the called telephone does not answer, the time taken for switch 49 to traverse the length of segment 50 is sufficient to close the line and permit the same to be reopened as soon as switch 49 has again moved off segment 50, so that the described cycle may be repeated. If the called telephone is answered while the sweep arm 48 is moving from the final element 52 counterclockwise around to segment 50, the called party can usually recover the line by depressing the button of the called telephone. If that is not possible as is the case with some switch board or private exchange arrangements, then the called party must wait until the switch is closed again by its contact with segment 50.

It will be recognized that as simulated dialing is repeated by the operation of the present invention, the continued rotation of spindle 27 carries the inverted L-shaped portion 72 of lever 70 downwards in virtue of the contact which point 75 makes with the screw threading of reduced portion 66. As a result, the junction represented by the pivot point 73 also moves downward. The lever 70 is positioned directly over switch 65. Hence, when point 75 has travelled to the lower extremity of the screw threading on reduced portion 66, switch 65 is opened to deenergize multicircuit 80 and telephone actuating circuit 81 so that the assembly is closed down.

Figures 2, 3:
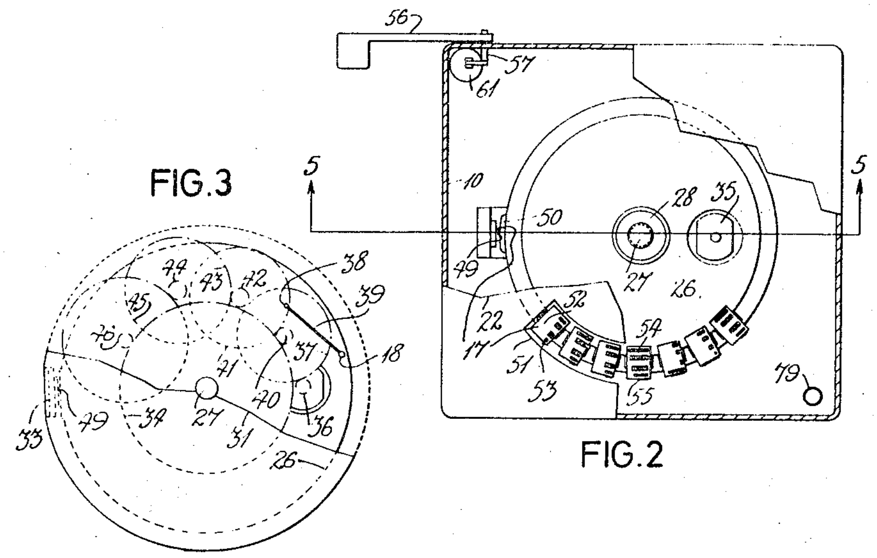
FIG. 2 is a fragmentary plan view of the assembly boxing contents.
FIG. 3 is an underside plan view of the gear reduction train of FIG. 2.

When the owner wishes to restore the assembly to normal operating condition again he depresses cap 28 against the resistance of spring 68, and rotates it to align the reset arrows shown in FIG. 1. This causes the screw threaded reduced portion 66 to move downwardly so that point 75 is returned to the uppermost ring of the screw threaded portion and is restored to the position depicted in FIG. 3 upon release of cap 28. Additionally, the end thrust downwardly upon spindle 27 is transmitted to solenoid plunger 78 to reset switch or relay 77 and thereby close alarm circuit 11 at that point. As depicted, drive gear 34, commutator plate 31, and the follower action 33 will move downwardly with endwise downward movement of spindle 27 which will also disengage gears 33 and 46.

In conclusion it should also be explained that the present basic inventive concept is adapted for direct connection between the described assembly and telephone call making circuitry direct. In other words, it should not be limited to the necessity for placement adjacent a telephone set for use in association with an arm 56 to pulse the buttons 16. By contrast, the said arm 56 might be dispensed with and perhaps also the solenoid 61 together with the mechanical parts aforesaid extending between the solenoid 61 and the lever 56. In contrast with what has been described herein (which requires no modification whatsoever with telephone company owned existing equipment), a direct connection from switch 49 to the said telephone call-making circuitry would require telephone company sanction and cooperation in most instances presumably except perhaps for certain private installations. It will therefore be appreciated that it is the contents of the boxing 21, and, separately or in combination with the parts just stated, which, conceptually regarded, is the invention, and in this connection, for example, it will be understood that whereas the arm 33 has been said to rotate about a stationary set of elements, obviously the arm might remain stationary and the set of elements rotate, among many possible variations suggested by this disclosure.

Accordingly, various modifications can be made within the scope of the inventive concept disclosed. Accordingly, it is intended that what is set forth herein should be regarded as illustrative of such concept and not for the purpose of limiting protection to any particular embodiment thereof, and that only such limitations should be placed upon the scope of protection to which the inventor hereof is entitled, as justice dictates.

I claim:

1. An alarm assembly for use in association with an alarm circuit actuated by fire, unauthorized entry, or service failure wherein means are provided for:

A. controlling the opening of a telephone line upon actuation of said alarm circuit by simulating the removal of the receiver of a telephone set from the button, or hook which is conventionally depressed by the weight of a telephone receiver; and B. for simulating the dialing of a predetermined telephone number by initiating the intermittent depression of said button, or hook, characterized by (i) including a set of adjacent elements mounted for individual rotation each element having an undulating profile, or surface providing promontories or recessions equal in number to the interruptions which occur when a given number is dialed, a follower action engageable with said promontories or recessions of said set of elements, said set and said action being relatively movable and (ii) in that said elements each have a substantially cylindrical surface, said promontories or recessions being provided on the said cylindrical surface of each of said elements, said promontories or recessions lying in rows extending parallel with the rotary axis of said element, there being space on said surface for ten rows containing a different number of promontories or recessions from one to ten in a single file thereof, said elements being linearly and successively engageable by said follower action.

2. The invention according to claim 1 in which said set of elements is semicircularly arranged.

3. The invention according to claim 1 which is also characterized by including a supporting structure for said set of elements, said supporting structure and said elements being normally stationary, and means for rotating said follower action successively past and against said promontories or recessions to initiate said intermittent actuation of said button, or hook.

4. The invention according to claim 1 which is further characterized in that said follower action is movable and is provided with switch means thereon, means for moving said follower action, said switch means being so movable past and against said promontories or recessions to cause an intermittent actuation of said switch means against said promontories or recessions and thereby intermittently energize and associated solenoid and lever.

5. The invention according to claim 2 which is also characterized by including a supporting structure for said set of elements, said supporting structure and said elements being normally stationary, and means for rotating said follower action successively past and against promontories or recessions to initiate said intermittent actuation of said button, or hook, said set of elements being semicircularly arranged, and switch means on said follower action, said switch means being rotatable past and against said promontories or recessions to cause intermittent actuation of said switch means against said promontories or recessions and thereby intermittently energize an associated solenoid and lever.

6. The invention according to claim 2 which includes a follower-stopping and assembly-resetting means, said follower-stopping means including a spindle positioned concentrically with respect to said semicircularly arranged set of elements, a spiral-threaded portion on said spindle, said shaft and threaded portion being rotatable with said follower action, means in contact with said spiral-threaded portion moveable therealong under the influence of the rotation of the same, including a switch for causing the stoppage of further rotation of said follower action when said means in contact with said spiral-threaded portion have reached their end of travel, said assembly resetting means including said spindle, a manually depressible cap attached to said spindle, and spring means about said spindle clear of said threaded portion, said spring means resisting the depression of said cap, depression of said cap against the resistance of said spring means causing said spindle to end-shift and, upon release, carry with it said means in contact with said threaded portion and thereby reset said alarm assembly.